*INVENTOR.*
JOSEF LATZEN
BY *Robert H. Jacob*
AGENT

United States Patent Office 2,695,185
Patented Nov. 23, 1954

2,695,185

BALL AND SOCKET JOINT

Josef Latzen, Dusseldorf-Oberkassel, Germany, assignor to A. Ehrenreich & Cie., Dusseldorf-Oberkassel, Germany, a firm Application August 15, 1950, Serial No. 179,535

3 Claims. (Cl. 287—90)

My invention relates to rod joints for various purposes, and more especially to improvements in rod joints of the ball and socket type, widely used e. g. in steering gear and like controlling devices of wheeled vehicles.

The invention aims at providing a redesigned, structurally simple ball and socket joint, the socket or housing of which can be manufactured with greater economy as regards material and labor and can be kept in good working condition and repair at lower cost than heretofore.

In contradistinction to prior art ball and socket joints, the housing or socket of which is generally made of high grade steel or other costly material, alloyed so as to be capable of being locally hardened by a heat treatment so as to present highly wear resistive inner bearing faces in sliding contact with the ball, the housing of the ball and socket joint redesigned according to this invention can be made of a less costly material and without any heat treatment or othe risky hardening operations.

Other advantages obtained will be disclosed hereinafter.

The structural features of the ball and socket joint redesigned according to this invention are set forth in the following specification and will be better understood by practitioners from the accompanying drawing, in which Fig. 1 shows the housing of the rod joint by way of an example in vertical cross section;

According to this invention in the housing 1, enclosing the ball head of rod 6, separate ball bearing means of specific shape are fitted and fixed intermediate the inner walls of the housing and the ball.

Figure 1:
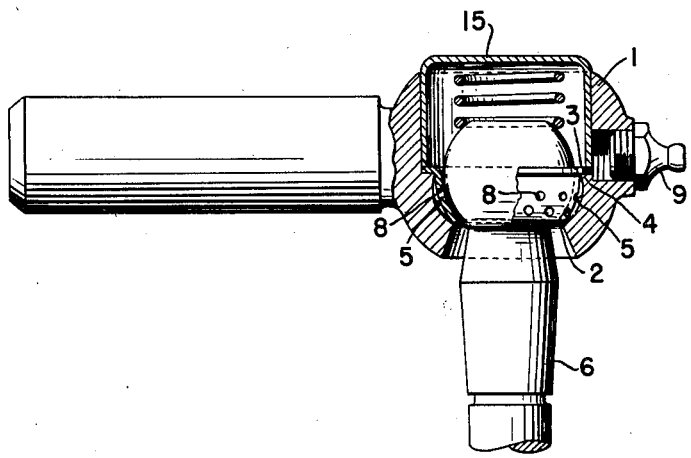

As seen in Fig. 1 the ball bearing means concerned comprise a spherical segmental shell or lining 2, and means for fixing the latter in the housing. Good results were obtained with shells made of thin steel sheet, case hardened yet of a somewhat elastic nature, which are formed with a flat upper flange 3, outwardly projecting circumferentially, and which rests on an annular recess 4 in the housing, being fixed and retained by a clamping cap 15.

The housing 1 may be conveniently formed with spherical inner faces for supporting the shell.

Preferable and supplemental structural features of the ball and socket joint redesigned according to this invention, are perforations, such as holes or slots 8 in the shell 2, distributed circumferentially, and an annular recess or cavity 5, formed in the housing, whereinto the shell 2 will yieldingly bulge under accidental heavier loads, and wherein a lubricant is received and retained, which is fed into the housing laterally through a hole and cap 9, screwed thereinto.

Figure 2:
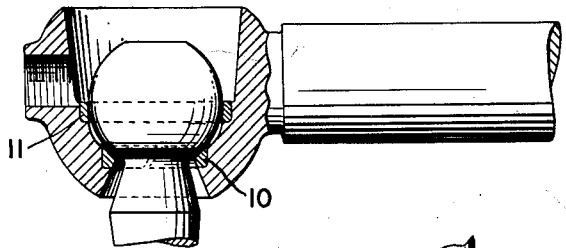
Fig. 2 is a cross section through a structurally modified housing.

In the structurally modified embodiment of my invention, shown in Fig. 2, the redesigned ball bearing means comprise bearing rings 10, 11 frictionally fixed by push fit into annular recesses of the housing in spaced relation to each other, and having bearing faces flush with those of the housing.

Figure 3:
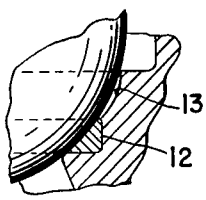
Fig. 3 shows a partial cross section of larger scale through another structurally modified housing.

Split spring rings may be conveniently used, frictionally fixed in loaded condition in the housing. A single ring 12 of triangular cross sectional shape (Fig. 3), fitted closely to the lower aperture of the housing, or of quadrangular profile, as seen at 10, and fitted right in the aperture, may be used to equal advantage.

An annular cavity or recess 13 may be formed intermediate said rings in the housing for the reception of a lubricant.

Various other structural modifications and changes may be made in the shaping and fitting of the ball bearing means shown and described, without departing from the spirit and the salient ideas of my invention.

What I claim is:

1. A ball and socket joint comprising a stud having a ball end and a shank projecting from said ball end, a hollow housing provided on one side thereof with an aperture, said housing receiving the ball end of said stud with said shank extending through said aperture for free angular movement therein, a concave surface defined by the inner surface of said housing and extending from said aperture to a height not exceeding the normal location of the equatorial plane of said ball end to define a support for seating said ball end, said concave surface having a greater radius of curvature than the radius of curvature of said ball end and forming a radial flange outwardly projecting circumferentially near the normal equatorial plane of said ball end, and insert means of wear resistant material supported on said flange of said concave surface and adjacent said aperture for forming a bearing surface for engaging a bearing surface on said ball end.

2. A ball and socket joint comprising a stud having a ball end and a shank projecting from said ball end, a hollow housing provided on one side thereof with an aperture, said housing receiving the ball end of said stud with said shank extending through said aperture for free angular movement therein, a concave surface defined by the inner surface of said housing and extending from said aperture to a height not exceeding the normal location of the equatorial plane of said ball end to define a support for seating said ball end, said concave surface having a greater radius of curvature than the radius of curvature of said ball end and forming a radial flange outwardly projecting circumferentially near the normal equatorial plane of said ball end, and insert means of wear resistance material supported by said concave surface for forming a bearing surface for engaging a bearing surface on said ball end, said insert means being defined by a shell conforming to the curvature of said ball end and having a flange supported on said radial flange of said concave surface and an edge supported adjacent said aperture.

3. A ball and socket joint comprising a stud having a ball end and a shank projecting from said ball end, a hollow housing provided on one side thereof with an aperture, said housing receiving the ball end of said stud with said shank extending through said aperture for free angular movement therein, a concave surface defined by the inner surface of said housing and extending from said aperture to a height not exceeding the normal location of the equatorial plane of said ball end to define a support for seating said ball end, said concave surface having a greater radius of curvature than the radius of curvature of said ball end and forming a radial flange outwardly projecting circumferentially near the normal equatorial plane of said ball end, and insert means of wear resistance material supported by said concave surface for forming a bearing surface for engaging a bearing surface on said ball end, said insert means being defined by a first ring disposed on said flange and a second ring disposed around said aperture.

References Cited in the file of this patent

UNITED STATES PATENTS

| Number | Name | Date |
|---|---|---|
| 1,653,352 | Faudi | Dec. 20, 1927 |
| 2,274,420 | Katcher | Feb. 24, 1942 |
| 2,527,787 | Berger | Oct. 31, 1950 |

FOREIGN PATENTS

| Number | Country | Date |
|---|---|---|
| 507,025 | Great Britain | June 8, 1939 |